United States Patent [19]

Martin

[11] Patent Number: 5,440,651
[45] Date of Patent: Aug. 8, 1995

[54] PATTERN RECOGNITION NEURAL NETWORK

[75] Inventor: Gale L. Martin, Austin, Tex.

[73] Assignee: Microelectronics and Computer Technology Corp., Austin, Tex.

[21] Appl. No.: 49,967

[22] Filed: Apr. 20, 1993

Related U.S. Application Data

[63] Continuation of Ser. No. 714,200, Jun. 12, 1991, abandoned.

[51] Int. Cl.⁶ .............................................. G06K 9/62
[52] U.S. Cl. .................................. 382/156; 382/159; 382/173; 395/21
[58] Field of Search ....................... 382/14, 15, 9, 36; 395/10, 20, 21, 62, 77

[56] References Cited

U.S. PATENT DOCUMENTS

| | | | |
|---|---|---|---|
| 3,873,972 | 3/1975 | Levine | 382/14 |
| 4,599,693 | 7/1986 | Denenberg | 382/15 |
| 4,933,872 | 6/1990 | Vandenberg et al. | 382/15 |
| 4,979,227 | 12/1990 | Mittlebach et al. | 382/14 |
| 5,058,180 | 10/1991 | Khan | 382/14 |
| 5,058,184 | 10/1991 | Fukushima | 352/14 |
| 5,073,955 | 12/1991 | Evers | 382/14 |
| 5,086,479 | 2/1992 | Takonaga et al. | 382/14 |

OTHER PUBLICATIONS

Rumelhart et al., "Learning Representations by back-propagating errors", *Letters to Nature*, Nature, vol. 323, Oct. 1986, pp. 533–538.
A. Waibel, H. Sawai and K. Shikano, "Modularity and Scaling In Large Phonemic Neural Networks", ATR Interpreting Telephony Research Laboratories, included in an ATR Technical Report dated Aug. 5, 1988.
J. D. keeler, D. E. Rumelhart and W. Leow, "Integrated Segmentation and Recognition of Hand-Printed Neumerals", Morgan Kaufmann (Authorized for Publication on Jan. 16, 1991).
D. Rumelhart, G. Hinton, and R. Williams, "Learning Internal Representations by Error Propagation", Published in D. Rumelhart & J. McClelland (Eds.) "Parallel Distributed Processing: Explorations in the Microstructures of Cognition", vol. 1, Cambridge, Mass.: MIT Press 1986.
T. J. Sejnowski, & C. R. Rosenberg (1986), "NETtalk: A Parallel Network that Learns to Read Aloud", John Hopkins University Electrical Engineering and Computer Science Technical Report JHU/EECS-86/01.
C. Johnson, "Synaptics Gives the Eye to OCR System", Article in Electronic Engineering Times, p. 1 (Dec. 16, 1991).

*Primary Examiner*—Joseph Mancuso
*Attorney, Agent, or Firm*—Gregory M. Howison

[57] ABSTRACT

A multi-layered pattern recognition neural network that comprises an input layer (28) that is operable to be mapped onto an input space comprising a scan window (12). Two hidden layers (30) and (32) map the input space to an output layer (16). The hidden layers utilize a local receptor field architecture and store representations of objects within the scan window (12) for mapping into one of a plurality of output nodes. Each of the plurality of output nodes and associated representations stored in the hidden layer define an object that is centered within the scan window (12). When centered, the object and its associated representation in the hidden layer result in activation of the associated output node. The output node is only activated when the character is centered in the scan window (12). As the scan window (12) scans a string of text, the output nodes are only activated when the associated character moves within the substantial center of the scan window. The network is trained by backpropagation through various letter string such that the letter by itself within the substantial center of the scan window (12) will be recognized, and also the letter with constraints of additional letters on either side thereof will also be recognized. In addition, the center between characters is recognized when it is disposed substantially in the center of scan window (12), and a space is recognized when it is disposed within the substantial center of the scan window (12).

21 Claims, 6 Drawing Sheets

FIG. 4

PATTERN RECOGNITION NEURAL NETWORK

This application is a Continuation, of application Ser. No. 07/714,200, filed Jun. 12, 1991 now abandoned.

TECHNICAL FIELD OF THE INVENTION

The present invention pertains in general to neural networks, and more particularly, to a multi-layered, feed forward neural network which is operable to scan a visual input field to simultaneously locate and classify objects on which it has been trained.

BACKGROUND OF THE INVENTION

An object recognition system, such as a system to recognize handwriting, typically requires separate development of a number of components. These components include a segmentation system to isolate the object, or character, from its background, a size normalization system to remove irrelevant variations, a feature extraction system to identify the features that discriminate the object from others, a classification system, and a system to improve classification accuracy by incorporating contextual constraints. One technique that can integrate a number of these steps is backpropagation neural networks, as described in D. E. Rumelhart, G. E. Hinton, and R. J. Williams, "Learning Internal Representations by Error Propagation" (in D. E. Rumelhart & J. L. McClelland, Parallel Distributed Processing, Vol. 1, 1986.

Application of backpropagation techniques to handwriting recognition initially focused only on the classifier component. In these type of systems, the input to the net is a feature vector and its target output vector, with the network doing the job of partitioning the feature space to enable classification. There have been a number of demonstrations that backpropagation techniques can also take over the job of feature selection and extraction. In these systems, the input to the network is a pre-segmented, size-normalized character array and its target output vector. The network jointly optimizes feature selection and classification, and thereby frees the system developer from time-consuming, iterative development efforts caused by experimenting with different feature sets. There is also some indication that generalization accuracy is relatively robust across variations in the size of the input image, and variations in the nature of the architecture. This work suggests backpropagation learning can handle a large range of variability in the input and therefore that this technique can be applied to integrating more of the heretofore separate components of recognition.

An input representation that can be used for this integration is the scanning window technique that has been applied in the domains of speech synthesis and speech recognition. In the speech domain an input window scans a signal that varies over time and enables the immediately adjacent context of a speech object to affect its classification by the system. One system is that described in T. J. Sejnowski and C. R. Rosenberg, "NETtalk: a parallel network that learns to read aloud", *The John Hopkins University Electrical Engineering and Computer Science Technical Report*, pages 663–672 (1986). This speech synthesis system is based on an automated learning procedure for a parallel network of deterministic processing units. After training on a corpus of informal continuous speech, it is capable of capturing most of the significant regularities in English pronunciation as well as absorbing many of the irregularities. Another similar technique used for speech recognition is described in A. Waibel, H. Sawai, K. Shikano, "Modularity and Scaling in large phonemic Neural Networks", *Advanced Telecommunications Research Institute Technical Report* II-0034, (1988).

SUMMARY OF THE INVENTION

The present invention disclosed and claimed herein comprises a multi-layered neural network that includes an input layer, an output layer and at least one hidden layer. The input layer maps into a two-dimensional scan window, the scan window defining an input space that can be scanned over objects. The output layer is comprised of at least one node to represent the presence of a desired object substantially centered in the scan window. The hidden layer has local receptive fields and is interconnected with the input and output layers. The hidden layer maps the input layer to the output layer, with the hidden layer providing a representation of the desired object associated with the at least one node. The representation stored in the hidden layer corresponds to the desired object centered in the scan window.

In another aspect of the present invention, a plurality of objects are provided, each associated with one of a plurality of nodes in the output layer. The hidden layer contains representations of each of the objects when the object is centered within the scan window. Therefore, activation of the associated output node is present only when the associated object is substantially centered within the scan window. The objects can either be numbers, letters, or other textual symbols.

In a further aspect of the present invention, the output layer also provides an output for the case where two objects are disposed about the center of the scan window and on either side thereof, and also the situation where no object is disposed in the substantial center of the scan window. Representations for each of these situations is stored in the hidden layer.

In a yet further aspect of the present invention, the hidden layer is comprised of a first layer and a second layer. The first layer contains local receptor fields with shared weights and the second layer contains local receptor fields with no shared weights. The weights are learned by backpropagation to provide the representations of the desired objects that may be recognized within the scan window.

BRIEF DESCRIPTION OF THE DRAWINGS

For a more complete understanding of the present invention and the advantages thereof, reference is now made to the following description taken in conjunction with the accompanying Drawings in which:

FIG. 4 illustrates one example of the neural network;

DETAILED DESCRIPTION OF THE INVENTION

Figure 1:
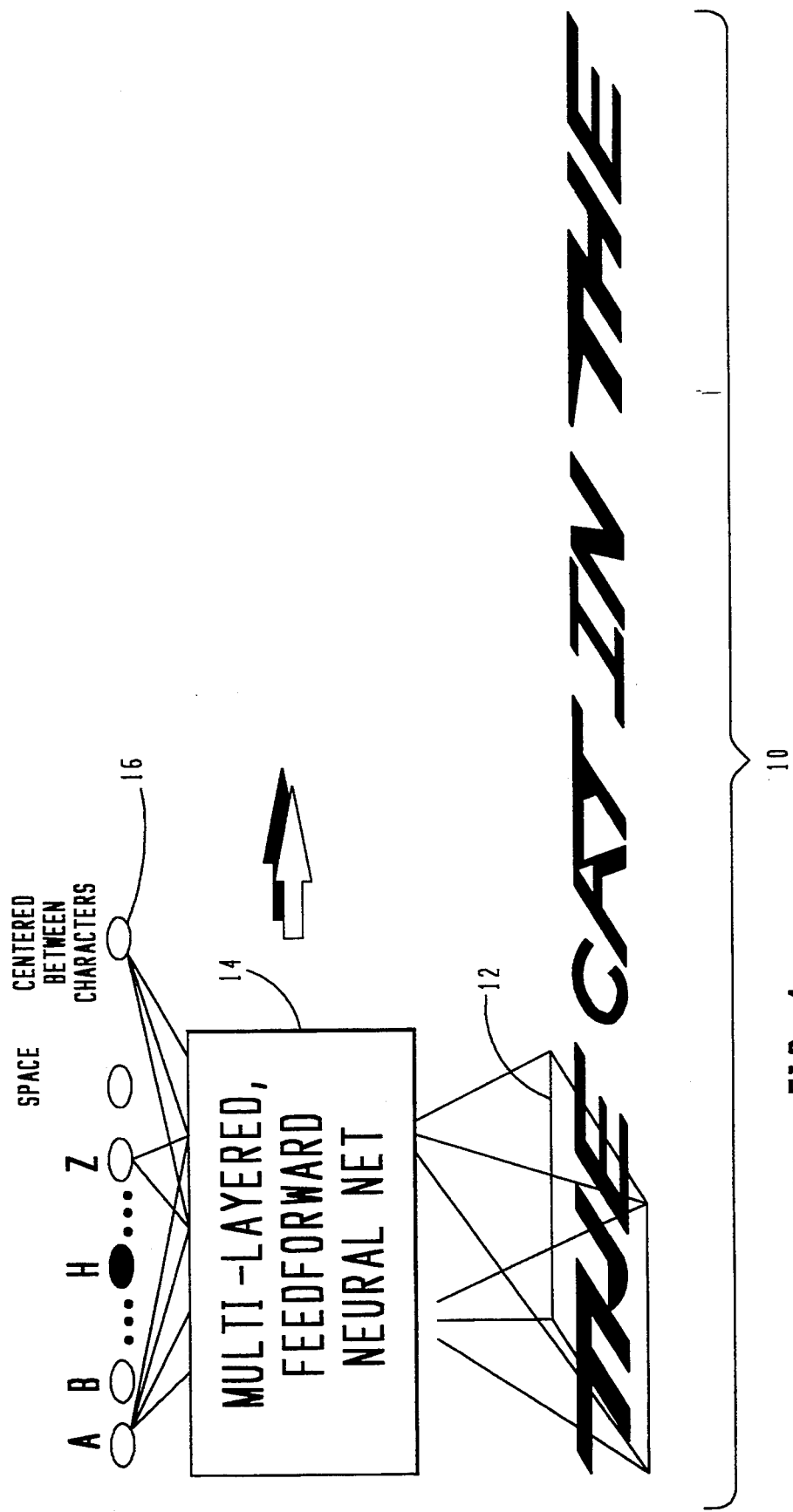
FIG. 1 illustrates a diagram of the neural network and scanning system of the present invention.

Referring now to FIG. 1, there is illustrated a simplified block diagram of the multi-layered feed forward network utilized with the present invention. A string of text 10 is provided that consists of characters that are oriented in a predetermined configuration. The object of the system is to scan this text and make decisions as to the sequence of letters. Alternatively, numbers or, in general, any type of object could be scanned. A scan window 12 is provided that is operable to be disposed over a string of characters and have the string of characters centered therein. The window 12 is operable to be scanned across the text 10 with the text 10 normalized within the scanning window 12. As will be described hereinbelow, the network performs a pattern recognition on the objects or letters centered within the scan window 12. The objects or letters disposed around the centered object or character provide how the object or character appears to the network.

A multi-layered feedforward neural network 14 is provided which has the input layer thereof connected to the input space defined within the scan window 12. An output layer 16 is comprised of a plurality of output nodes each of which correspond to a potential character or object. In the present example, the output nodes in the output layer 16 correspond to the letter of the alphabet, a space and an output that defines when the center of the scan window 12 is positioned between characters. It can be seen that the output node in output layer 16 associated with the "H" is illustrated in a dark shade representing that an "H" is disposed in the center of the scan window 12. In fact, the word "THE" is the word that is disposed within the scan window 12 with the "H" thereof centered. The network 14 was trained on a series of letters such that it recognizes the centered character in spite of the possible lack of recognition between adjacent characters, as will be described in more detail hereinbelow.

Figure 2:
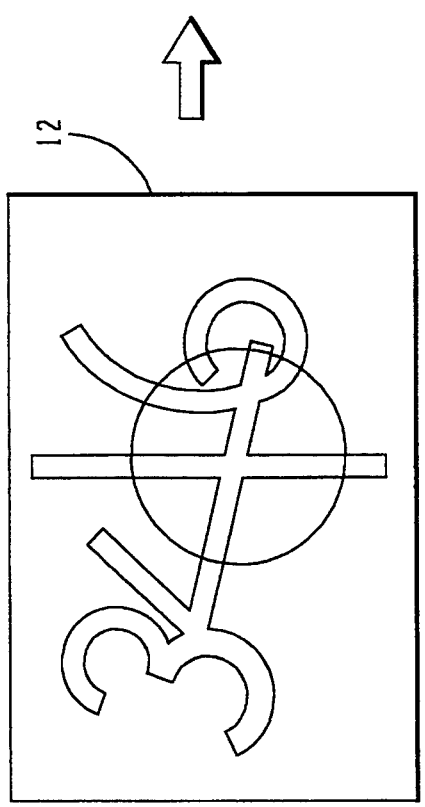
FIG. 2 illustrates an example of a scanning window.

Referring now to FIG. 2, there is illustrated an example of a trigram with the numbers "3", "4" and "6" in that order. However, it can be seen that the three separate numbers are not clearly separated or segmented, and they are somewhat distorted and overlapping. The network must first provide a segmentation of the characters which is done in the present invention by defining a character as being centered within the scan window 12. The number "4" is the centered number, and is the number that must be recognized. After recognizing that it is a centered character within the scan window 12, features of the number must be selected and extracted and then the number classified as to whether it is a 0, 1, 4 . . . 9. By training the network with any combination of the number "4", and associated numbers around the centered numbers, the features of a "4" can be recognized apart from other numbers.

Figure 3:
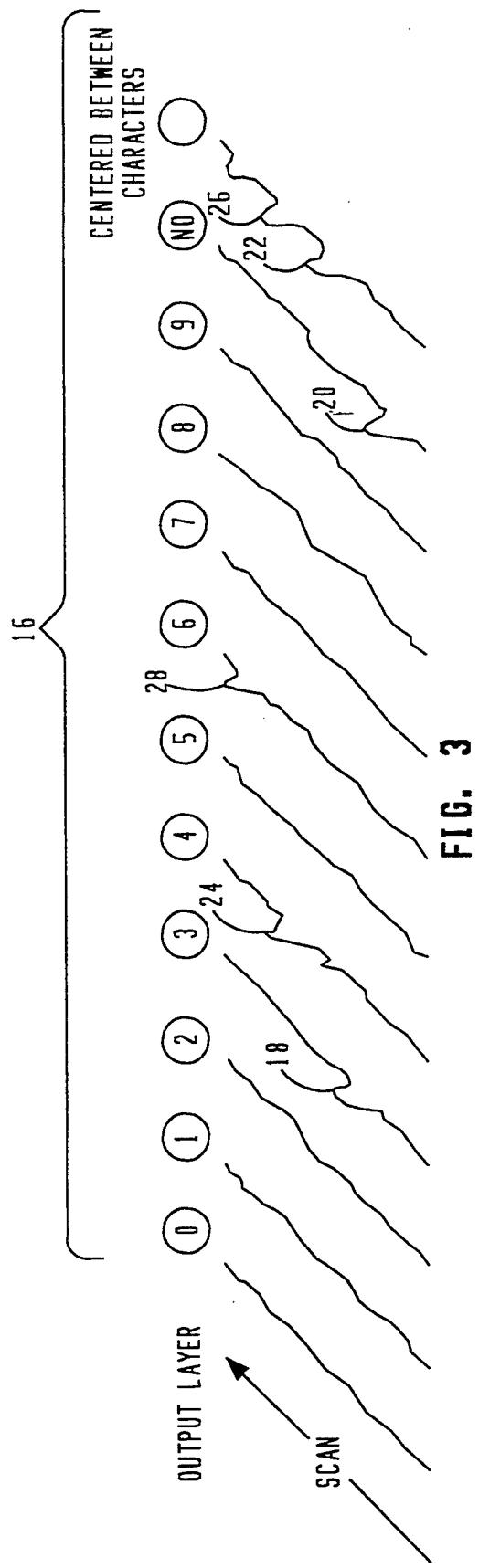
FIG. 3 illustrates a diagrammatic view of the output layer as a function of time.

Referring now to FIG. 3, there is illustrated a diagrammatic view of the output layers and the various outputs that would be derived therefrom when the trigram of FIG. 2 was scanned. As described above, there must be an output node for each possible character output. Since the example of FIG. 2 is numbers, the characters would range from 0 through 9 with an additional output node illustrating a space or no character and an additional output node representing a space between characters or the center of the characters. It can be seen that as the trigram of FIG. 2 is scanned, the first output node that will have a high activation energy would be the one associated with the number "3". This will result in a peak 18 that represents a relatively high activation energy over the basic output level which can be represented by noise. Typically, a decision is not made until the activation energy rises above a predetermined threshold. Prior to scanning the "3", the output node associated with the space or "no character" would have a relatively high activation energy, as represented by peak 20. After the "3" has been scanned, due to its being centered in the window, the next position that would be centered in the window would be a space between the characters, which would be represented by a peak 22 in the output node associated with that feature. As the window 12 is scanned further across the trigram of FIG. 2, the "4" will become centered in the window and a peak 24 will show up in the output node associated with the number "4". A second peak 26 will then occur when the space between the "4" and "6" in the trigram of FIG. 2 is centered in the scan window 12, and then a peak 28 will show up in the output node associated with the number "6" when the "6" is centered in the scan window 12 of FIG. 2.

The system of the present invention utilizes a single backpropagation network with an enlarged input field to recognize each letter in the context of its surrounding letters in a string, this context comprising the information that exists within the scan window 12. The system avoids the need to segment characters prior to recognizing them, and also applies visual, contextual constraints to improve the recognition accuracy. Therefore, the window 12 must be wide enough to include several letters of a string or objects to provide this contextual information, and a target vector representing what is in the center of the window for each input. Normalization of the input string is based on a fixed vertical size of the field, or on the basis of other indicators of the vertical extent of the string of text (or objects). As the window scans along a text line (or the text is scanned under the window), will become centered on a character or a space or between two characters. Therefore, it can be seen that there is no need to explicitly segment the characters, since pattern recognition is defined as recognizing what is in the center of the window as opposed to segmenting the characters and then extracting the features therefrom.

The peripheral visual information of the window, the visual context, aids recognition to the extent that it is sufficiently redundant to constrain the recognition decision, this being a function of the learning of the network. There are three types of redundancy that are useful during learning and by which the network can optimize classification. They are: 1) regularities in the way individual characters look, 2) regularities in the sequences of letters, and 3) regularities imposed by the differential likelihood of occurrence of individual characters. To accurately reflect handwritten English text, for example, the training set should be drawn from a large and representative sample of writers writing a large and representative sample of English text. However, it should be understood that any type of object that is capable of existing in a pattern and which can be recognized thereby could be utilized. In the present examples described hereinbelow, English text is primarily utilized, which training set utilizes either individual or isolated uppercase hand-printed letters, and then utilizing an English trigram frequency table to reflect local sequence irregularities in English text. The inputs to a network then correspond to constructed images of these trigrams.

In a first example, hand-printed letters were collected from 118 people writing isolated letters using a stylus digitizer. The set was first divided into a training set of 6000 training samples and 2368 test samples, with the two sets containing samples from different people. Within these sample sets, letter probabilities were roughly equivalent. Each set was then sub-divided to form 26 pools, each containing the samples of one of the letters "A" through "Z". The stylus collects a sequence of x-y coordinate pairs at 200 points per second at a spatial resolution of 1000 points per inch. The temporal sequence representation for each character is converted to a size-normalized bitmap array using a size normalization factor based on whichever of the two axes, horizontal or vertical, has the maximum extent. This method preserves the original aspect ratio of the characters. The character arrays all have the same height and width, but the characters within the arrays show some variation in height or width. Each bitmap array is then blurred through convolution with a gaussian distribution. Early experiments in our laboratory reveal that blurring improves generalization. The result of these operations is that each character is represented as a 15×24 grayscale image with pixel values ranging from 0 to 1.0. In addition to the A-Z pools, there was also a space pool containing one sample of a 15×24 array composed of all zeroes.

Trigrams of these letters were formed by drawing three letters from these pools in a sequence and with a frequency determined by a table reflecting the frequencies of trigrams (letter triplets) in a corpus of about one million words from common English text. This is described in Solso, Barbuto & Juel, "Bigram and Trigram Frequencies and Versatilities in the English Language," *Behavior Research Methods & Instrumentation*, 1979, 11, pp. 475–484, which is incorporated herein by reference. In the following, the term "letter" should be interpreted as referring to either one of the 26 letters or a "space". The trigram frequency table does not contain the frequencies of trigrams containing spaces (e.g. _AA, AA_, A_A), which would occur as a net scans along the string. Frequencies for these "space"-including trigrams were estimated as follows. A positional bigram frequency table was used to estimate frequencies of the first two types. (This is described in Solso and Joe, "Positional Frequency and Versatility of Bigrams for Two Through Nine English Words," *Behavior Research Methods & Instrumentation*, 1980, 12, 297-343.) This table includes the frequencies of pairs of letters as they appear at the beginning and ends of words (e.g., _AA, and AA_, respectively). These frequencies were simply added to the trigram frequency table because they were collected from the same corpus as the trigram frequencies and so the relative probabilities were retained in the frequency values. The probabilities of trigrams having space in the middle (e.g., A_A) were estimated by using the frequency for each letter as it appears in the first and last positions in words, converting these frequencies to probabilities (by dividing each frequency value by the sum of the frequencies across letters for the first or last positions), and then multiplying these probabilities for all pairs of letters in each of the two positions. The relative probabilities of these space-including trigrams to that of the original—those not including spaces—was estimated from the knowledge that the corpus contained about one million words. These relative probabilities were then re-converted to frequency values and added to the original trigram frequency table. One other goal was to enable the net to recognize isolated letters (_A_, _B_, etc.). The frequencies of these single letter trigrams was set at the frequencies of the individual letters, whatever their position within a trigram. The relative probabilities of this class of trigrams was arbitrarily set at 10% relative to the other trigrams, so that they could also be added to the original trigram frequency table.

Figure 4:
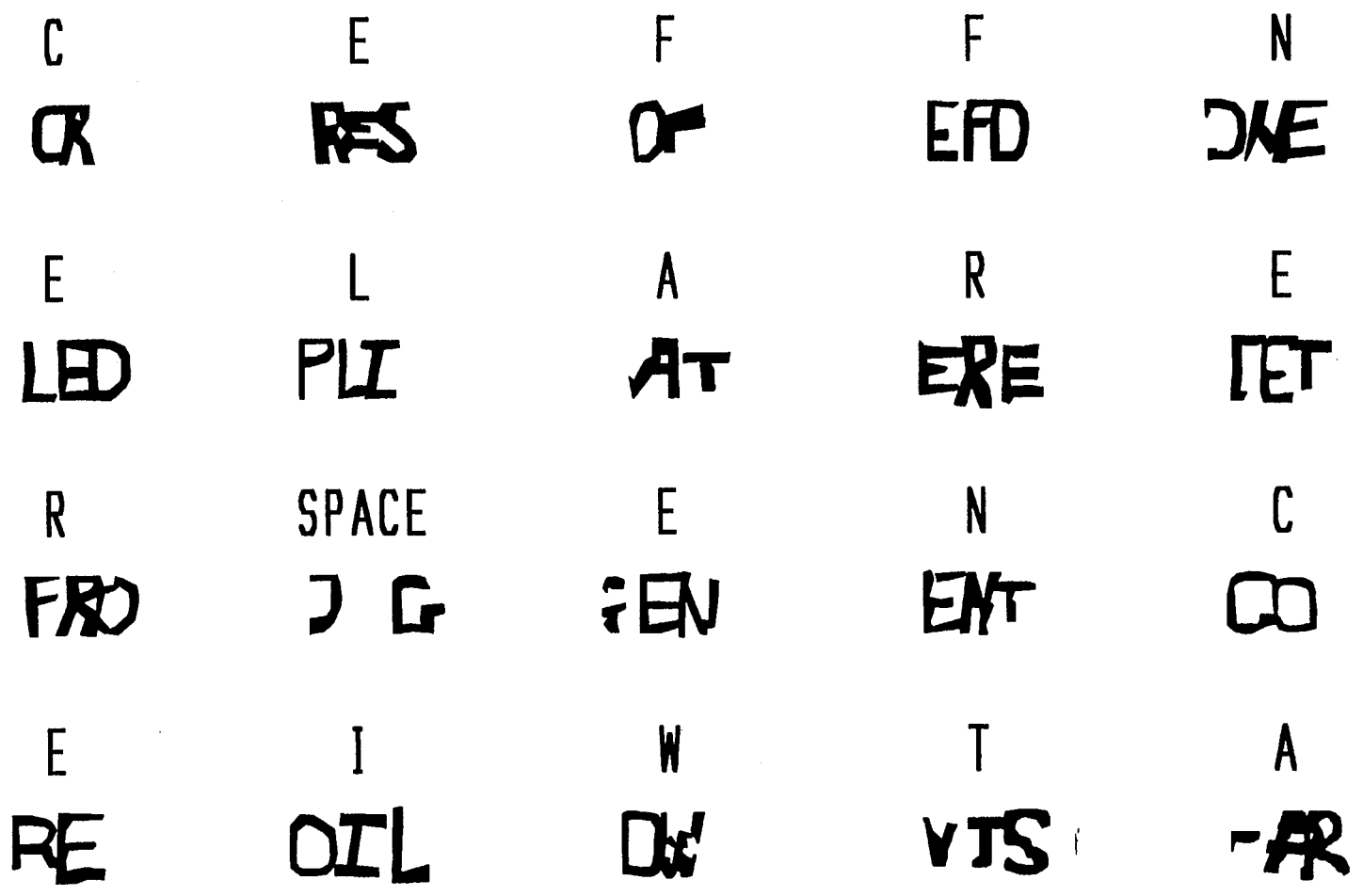

The visual characteristics of the trigrams were created as follows. The letters and spaces in a trigram were first laid down in a 55×24 array, with the middle letter centered in the array. Between-letter spacing within a trigram was varied randomly over a range of 7 pixels. Character arrays could be separated by as much as 3 pixels, just touching, or be overlapping by as much as 3 pixels. Then a scanning window moved over the array to form the 41×24 input windows given to the net. Three different input arrays were created for each trigram. One input array was centered on a character or space and the other two were centered between characters by shifting the window about half the width of a character in the forward and backward direction. The positioning of the window on the 55×24 array included a random error of plus or minus one pixel in the horizontal dimension. More specifically, a random error of plus or minus one pixel in the horizontal dimension and Centered-on-Character input arrays were created by reading from the 55×24 array starting from a randomly selected column within the seventh to ninth columns, and proceeding for 41 columns. The centered-between characters input arrays were created by reading from the 55×24 array starting from a randomly selected column within the first three columns of the 55×24 array, or from a randomly selected column within the thirteenth to fifteenth column, and in both cases proceeding for 41 columns. No trigrams were continuously selected and corresponding input arrays created during training, so the net presumably never trained on the same image more than once. FIG. 4 presents samples of the Centered-on-Character input windows. Training and test input windows were created in the same way, except that the test sets remained constant, and a separate set of letter pools collected from different people were used. There were two types of test sets. The mixed-sample test set consisted of 2400 samples of both the Centered-on-Character and Centered-Between-Characters types of input arrays in a 1-to-2 proportion with respect to each other. The other test set consisted only of 2400 Centered-on-Character input arrays.

Figure 5:
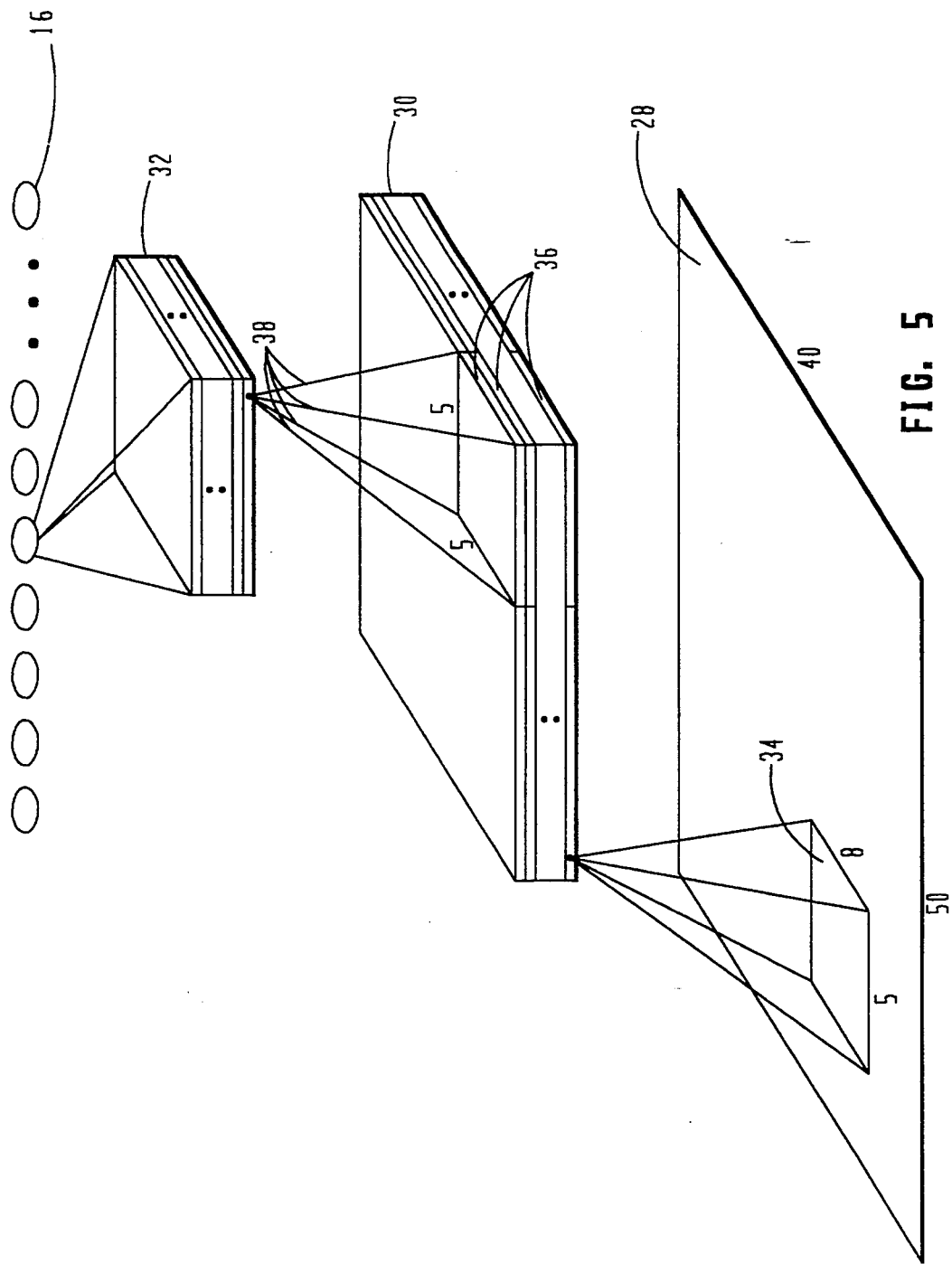
FIG. 5 illustrates a detailed diagram of the architecture incorporated into the neural network.

Referring now to FIG. 5, there is illustrated a block diagram of the network architecture utilized in the preferred embodiment of the present invention. The network architecture utilizes an input layer 28 that is comprised of 2,000 nodes that are arranged in a 50×40 gray scale array for each scan window 12 such that the input layer 28 can be mapped onto the input space of the window. The hidden layers are comprised of a first hidden layer 30 and a second hidden layer 32. The first hidden layer contains approximately 3,078 nodes and can be visualized as a 19×9×18 cube, where each 19×9 slice corresponds to a select single group of hidden nodes and there are 18 different slices, each slice corresponding to a single group of hidden nodes, each group or slice representing a feature. Each node has associated therewith a 5×8 receptive field 34 in the input layer 28. The receptive field within a group of nodes within the hidden layer 30 have randomly-initialized, but shared weights that result in equivalent feature detectors developing across the spatial extent of the input array. Adjacent receptive fields are offset by two pixels in the horizontal and/or vertical dimensions within the input space, bias values not being shared. The second hidden layer 32 contains 240 nodes and can be visualized as an $8 \times 3 \times 10$ cube, though the nodes within an $8 \times 3$ slice, there being 10 slices, do not share weights. Each node receives projections from local receptive fields 36 of the size $5 \times 5 \times 18$ within the first hidden layer 30. These projections are illustrated by lines 38. Therefore, there is a connection between the $5 \times 5 \times 18$ local receptive fields within each of the slices of the hidden layer 30 and each of the nodes in the second hidden layer 32. Each of these local receptive fields on the first hidden layer 30 therefore project to ten hidden nodes in the second hidden layer. Weights are not shared in the second hidden layer 32, as this would result in relatively slow learning when the shared weights were used in both hidden layers. Therefore, the second hidden layer 32 has local receptive fields that are not shared. This system is generally described in D. E. Rumelhart, G. E. Hinton & R. J. Williams, "Learning Internal Representations by Error Propagation" (in D. E. Rumelhart & J. L. McClelland, *Parallel Distributed Processing*, Vol. 1, 1986), which document is incorporated herein by reference. The primary difference is that the Rumelhart paper is a position invariant design with only one hidden layer. In the architecture of FIG. 5, the local tiered structure is only contained within the first hidden layer 30 and not within the second hidden layer 32.

The output layer 16 is global in that each of the nodes associated with the output layer 16 is connected to each of the nodes within the second hidden layer 32. Of course, various interconnect schemes could be utilized to minimize these interconnects.

During training of the network, a backpropagation method is utilized, which is conventional. New trigram windows are continuously created during training. The net is never trained on exactly the same image twice. In one example, training samples were grouped into sets of 1200 patterns for convenience. Initial tests showed that a net could quickly adjust to the greater frequency of Centered-Between-Characters input arrays and this slowed the learning of classifications of Centered-on-Character input arrays. To encourage training of the Centered-on-Character classifications, training sets consisting only of these types of input arrays were alternated with the training sets consisting of both Centered-Between-Characters arrays and Centered-on-Character arrays in a 2-to-1 ratio.

Generalization testing was performed continuously throughout training at intervals ranging from between 2400 patterns processed to 6000 patterns processed. Initially, testing for both types of sample sets, Centered-on-Character only and mixed, occurred after training on the mixed-samples set. As training continued, it was discovered that the network quickly adjusts to the relative frequency of output categories and so testing of the all-centered character windows was done immediately following training on an all-centered character window set. Testing of the mixed-samples was done immediately following training on a mixed-sample set. This separation improved accuracy rates, and may indicate that the best strategy is to use two networks, one that only distinguishes input arrays centered between characters from input windows centered on a character, and one that is supplied only in the latter case to distinguish between characters. Training was stopped after 450,000 training patterns had been presented, as training at test performance had levelled off.

Figure 6:
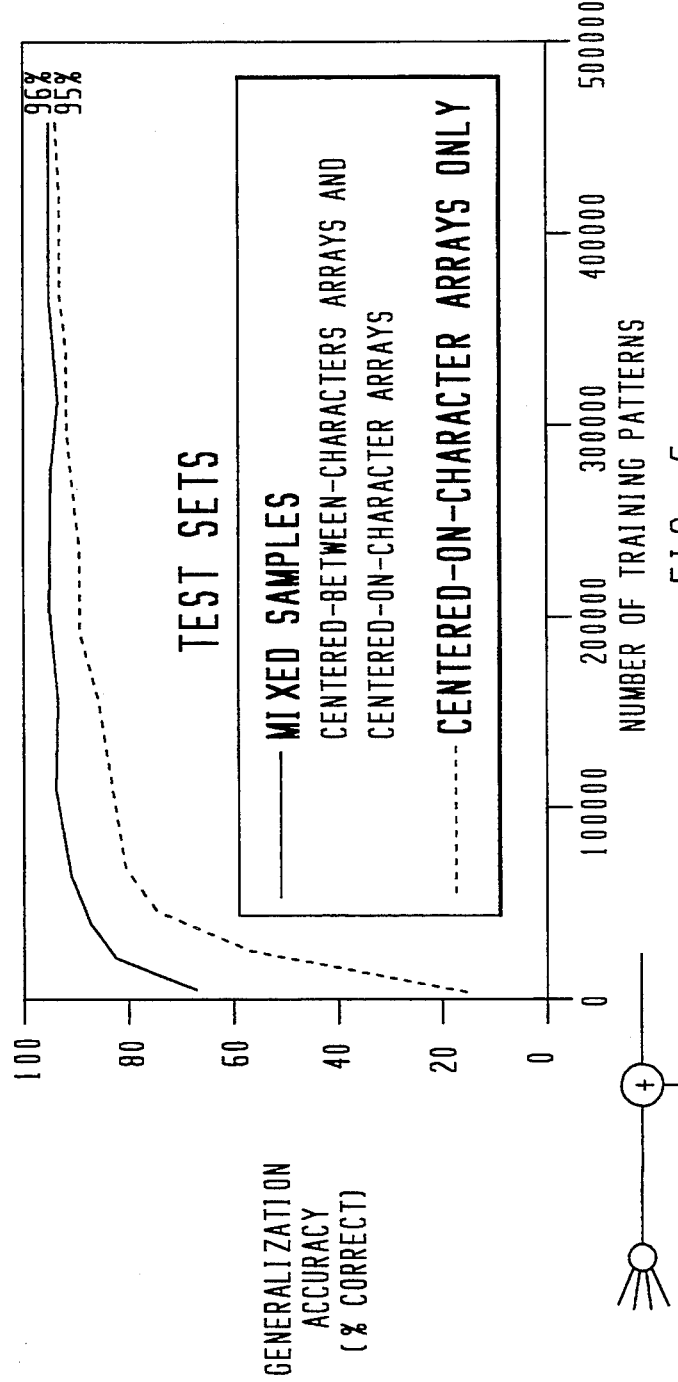
FIG. 6 illustrates a graph of the generalization accuracy versus the number of training patterns.
Figure 8A:
FIGS. 8 and 8a illustrate a decision network for connection to the output layer.
Figure 8:
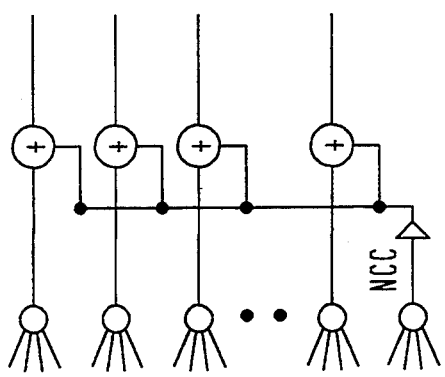

FIG. 6 illustrates the generalization test scores during training. Training in test accuracy rates were similar throughout training. For the mixed samples case, training and generalization test accuracies were equivalent. For the sets containing only Centered-on-Character arrays, training and test accuracy rates were very close throughout much of the training, but training accuracy leveled out sooner than test accuracy and lagged behind it by 2% at the end of training. As can be seen from FIG. 6, generalization accuracy for the mixed-samples test set was at 96% when the immediately 1200 training trials had consisted of mixed samples. Within this test sample, generalization accuracy on the Centered-Between-Characters arrays was 99% and for the Centered-on-Character arrays, it was 90%. Roughly half of the errors (2% of the total mixed-sample test set occurred as confusions between Centered-Between-Characters arrays and Centered-on-Character arrays, and a little less than half of these involved trigrams having a space in the center position). Within the pure, Centered-on-Character test set generalization accuracy reached 98% when the immediately preceding 1200 training trials had been on Centered-on-Character arrays only.

One strategy is to use the mixed-samples net to determine whether or not the scanning window is centered over a character in the pure-samples net to classify the letters. The overall accuracy rate of this latter two-net system would be the product of 98% (reflects 2% confusability errors between Centered-on-Character and Centered-Between-Character arrays), and 95% (reflects 5% error rate on pure-samples net). Thus, the overall accuracy rate would be 93%. The speed performance of such a two-net system could be optimized by replacing the first net with a net that has only two output nodes: one for when the scanning window is centered over a character and one for when it is centered between characters. This has been tried, and equivalent accuracy rates were obtained. There was an additional advantage of this latter net though, in that all of the errors occurring in the test set involved trigrams having a space in the center position. This suggests that it might be possible to devise a set of higher-level rules (e.g., dictionary lookup on alternative possibilities) that overcome the vast majority of confusability errors between Centered-on-Character and Centered-Between-Character arrays.

A qualitative impression of the net's capabilities can be gained by observing the sample trigrams in FIG. 4. The net correctly identified the center letter in all of these test-set trigrams even though, from a human perspective, the recognition decision is ambiguous. The net evidenced this ambiguity through close activation values in the output nodes corresponding to the letters that could be confused with each other.

Table 1 presents the generalization error and reject data for this net on the Centered-on-Character test arrays and the generalization error and reject rate data from a previous study described in Martin, G. L., & Pittman, J. A., "Function Complexity Effects on Backpropagation Learning", *MCC Technical Report # ACT-HI-062-90* (1990), which is incorporated herein by reference. In this study, a net was trained on the same letters, but represented as isolated, $15 \times 24$ grayscale arrays.

Rejections were based on placing a threshold for the acceptable distance between the highest and next highest activation values in the output vector. For the isolated letter case, the net had two hidden layers with the nodes in each layer having local receptive fields and shared weights. Experimentation showed that generalization rates in this latter case were fairly robust across architectures, assuming sufficient capacity to learn the training set, since experimentation with a variety of other net architectures (e.g., a one-hidden-layer net with 170 hidden nodes, a two-hidden-layer net with 365 hidden nodes). As the table indicates, generalization rates of the two nets are comparable, with a slight advantage for the present net which recognizes overlapping characters in the context of the surrounding letters.

TABLE 1

| REJECT RATE | ISOLATED LETTERS | OVERLAPPING LETTERS IN CONTEXT |
|---|---|---|
| 0% | 5% | 5% |
| 5% | 3% | 3% |
| 10% | 2% | 1% |
| 15% | 1% | .01% |
| 25% | .01% | 0% |

The overlapping nature of the letters makes the decision more ambiguous, even to the human eye, and the increased size of the input array may increase the complexity of the search task involved in learning. On the other hand, classifying the Centered-on-Character arrays is considered to be easier than classifying isolated letters for at least two reasons. The context of the surrounding letters is sufficiently redundant to enable the net to dis-ambiuate confusable letters. It is also the case that whereas the a priori probabilities of the letters in the Isolated-Letters case were equivalent; they were not for the Centered-on-Character arrays. In this latter case, the net might take advantage of the difference in a priori probabilities to improve overall accuracy.

The benefit of the surrounding context was assessed by creating a test set in which the letters surrounding the center letter were chosen randomly; the probabilities of occurrence for the center letter remained the same. In this case, test accuracy dropped from 94.3% to 92.8%. This is a small but statistically significant difference as the average difference between two different halves of the test set, across the final eight generalization tests of the Centered-on-Character arrays was 0.4% with a range of 0.07% to 0.75%. The extent to which the net improved overall accuracy by taking advantage of the difference in a priori probabilities for the center letter in a trigram was assessed by testing its performance on a set consisting of Centered-on-Character arrays for which all of the letters were randomly chosen for the test pools. In this case, generalization accuracy dropped to 75%.

Figure 7:
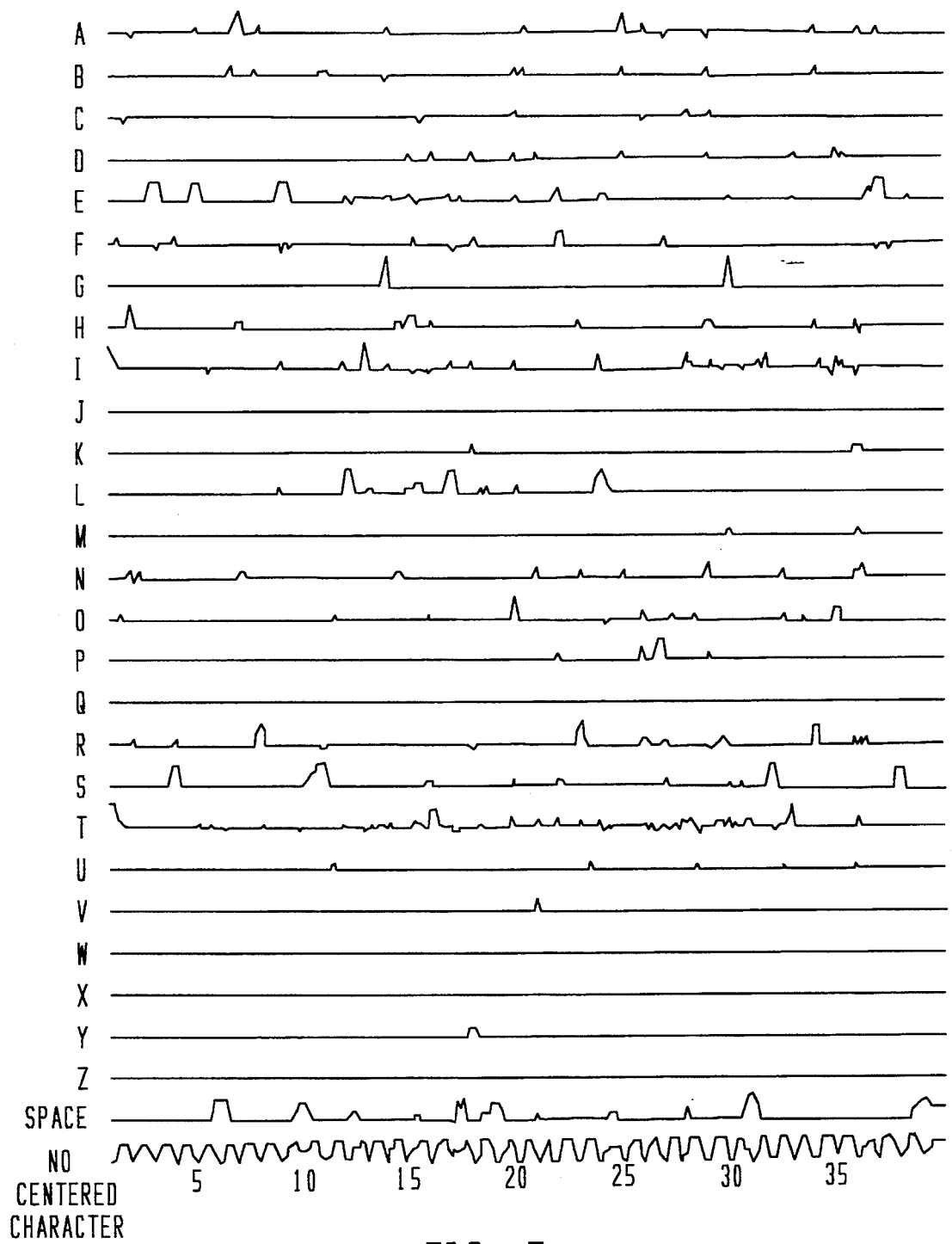
FIG. 7 illustrates a plot for one example of the scanning operation for a sentence.

Another way to evaluate generalization performance is to test accuracy as the net's input window scans along a continuous text string with regular, small incremental shifts in horizontal position. Up to this point, the focus has been on isolated trigrams, with only a small number of shifts represented. FIG. 7 reflects the net's generalization performance on a continuous text string corresponding to the sentence, THESE ARE SLIGHTLY OVERLAPPING STROKES. The image of this sentence was artificially created from letters in the test pools. The input arrays to the net were created by the input window scanning from left to right in two-pixel increments. Each of the 28 horizontal graphs, aligned vertically on top of one another, reflects the activation values of one of the 28 output nodes as the net scans horizontally across the text string shown at the top. The vertical, gray columns reflect points in the scan where the output activation value for the No-Centered Character node was 0.4 or less. These regions can be used to define an area over which the activation values in each of the 27 letter and space output nodes are averaged to produce classification decisions. The figures at the top of each of the gray columns represent the average activation values that exceeded the 0.2 baseline activation value. With this metric, the net made three classification errors, but in all cases the activation values of the correct letter nodes were very close to the "winning" output node, and the errors occurred in places for which application of a dictionary filter would have corrected the error.

The activation curves suggest that the net generalizes in a spatial sense. Recall that in the training and original test sets described hereinabove with respect to FIG. 4, three different input arrays were created for each trigram. One input array was centered on the center of a 15×24 character array, with a random positioning error of plus or minus one pixel around this point. The other two were centered between characters by shifting the window half the width of a character (8 pixels) in the forward and backward direction from the Centered-on-Character position, once again with a random positioning error of plus or minus one pixel around each of these two points. If the net had only learned to make classifications at these somewhat fixed locations, the activation peaks would be very sharp and cover only a 3-pixel area. Instead in this test, as the center of the scanning window first approaches and then passes over the center of a character or the center point between two characters, activation values first increase monotonically and then decrease monotonically. Typically the width of the activation peaks is about 8–12 pixels.

In summary, there has been provided a pattern recognition scheme utilizing a neural network. The scheme provides for training the neural network on characters that are centered within the input space of the neural network. The activation energy of an output node associated with this input space and the representation of that associated centered character or object exists only when the character is centered within the input space. A plurality of representations are stored within the network in hidden nodes and associated with different output nodes such that when any object is centered within the input space, its associated output node is activated. Representations of two adjacent characters on either side of the center of the input spaces also stored in the hidden nodes. By scanning the input space across the pattern of characters, the respective output node is activated when the character is centered within the window.

Although the preferred embodiment has been described in detail, it should be understood that various changes, substitutions and alterations can be made therein without departing from the spirit and scope of the invention as defined by the appended claims.

What is claimed is:

1. A multi-layered neural network for pattern recognition, comprising:
   an input layer for mapping into a two-dimensional scan window, said scan window defining an input space that can be scanned over objects and which said scan window is sized to encompass more than one object;

an output layer comprised of at least one output node to represent the presence of a desired object substantially centered in said scan window; and a hidden layer having local receptor fields and interconnected with said input layer and said output layer for mapping said input layer to said output layer, said hidden layer providing a stored representation of the position of said desired object in said scan window relative to the position when said desired object is substantially centered within said scan window such that a determination of the position of said desired object relative to the substantial center of said scan window can be made, wherein said stored representation is trained on said desired object at multiple positions in said scan window at different activation levels for select ones of said positions;

said at least one output node operable to be activated at a predetermined level when an object is disposed at a given position within said scan window, which given position in said scan window and object corresponds to said stored representations, said predetermined level being a function of the relative position of said desired object in said scan window to the substantial center of said scan window.

2. The neural network of claim 1, wherein said output layer comprises a plurality of output nodes corresponding to a plurality of desired objects which exist in a predetermined sequence and can be disposed adjacent each other and overlapping, and wherein said hidden layer contains a stored representation of the relative position of each of said desired objects to the substantial center of said scan window, such that when an object corresponding to any of said stored representations of said desired objects is disposed within said scan window, activation of the associated one of said output nodes results with a level representative of its relative position within said scan window.

3. The neural network of claim 2, wherein an additional one of said output nodes in said output layer is provided representing the presence of the center between two of said desired objects, and said hidden layer contains a stored representation of the relative position of the center between two of said desired objects to the substantial center of said scan window.

4. The neural network of claim 2, wherein said plurality of objects comprises letters of the alphabet.

5. The neural network of claim 2, wherein said plurality of objects comprises numbers from "0" through "9".

6. The neural network of claim 1, and further comprising an additional output node in said output layer for representing the position of the absence of an object within of said scan window relative to the substantial center of said scan window, and said hidden layer contains a stored representation of the position of the absence of a desired object within said scan window relative to the substantial center of said scan window.

7. The neural network of claim 1, wherein said stored representation of the portion of said desired object within said scan window is learned by backpropagation learning techniques.

8. The neural network of claim 1, wherein said hidden layer comprises a first hidden layer having local receptor fields having shared weights and a second hidden layer having local receptor fields and no shared weights.

9. The neural network of claim 1, wherein said desired objects in said scan window are normalized in size to said scan window.

10. A method for recognizing a pattern, comprising:

providing an input layer in a neural network;

mapping the input layer into a two dimensional scan window, the scan window defining an input space that can be scanned over objects and sized to encompass more than one of the objects;

providing an output layer in the neural network having at least one output node having multiple output levels that are operable to represent the position of a desired object within the scan window relative to a predetermined point in the scan window;

providing a hidden layer in the neural network and interconnecting the hidden layer with the input and the output layer;

mapping the input layer to the output layer with the hidden layer, the hidden layer providing a stored representation of the position of the desired object in the in the scan window relative to the predetermined point in the scan window such that a determination of the portion of the desired object relative to the substantial center of the scan window can be made, wherein the stored representation is trained on the desired object at multiple positions in the scan window at different activation levels for select ones of the positions; and activating the at least one output node in response to an object being disposed in the scan window and substantially corresponding to the stored representation in the hidden layer, the level of activation corresponding g to the position of the object in the scan window.

11. The method of claim 10, wherein the output layer comprises a plurality of output nodes that correspond to a plurality of desired objects that exist in a predetermined sequence and which desired objects can be disposed adjacent to each other and overlapping and comprising:

storing representations of each of the desired objects in the hidden layer that represent the position of the desired objects relative to the predetermined point in the scan window;

each of the representations associated with one of the output nodes; and activating the associated one of the output nodes when the associated one of the objects or a substantially similar representation thereof is disposed in the scan window, the output level of the activated output node corresponding to the position of the object within the scan position.

12. The method of claim 11 and further comprising:

providing an additional output node in the output layer;

storing in the hidden layer a representation of the position of the center between two of the plurality of desired objects relative to the predetermined point in the scan window; and activating the additional output node when the center between two objects, corresponding to the stored representation of the position center between two of the desired objects, is disposed in the scan window.

13. The method of claim 11, wherein the plurality of objects comprises letters of the alphabet.

14. The method of claim 10 and further comprising:
providing an additional output node in the output layer;
storing in the hidden layer the representation of the position of the absence of the desired objects relative to the predetermined point in the scan window; and
activating the additional output node when the position of the absence of the desired objects exists within the scan window corresponds to the stored representation of the position of the absence of the desired objects.

15. The method of claim 10 and further comprising training the neural network through backpropagation learning techniques to store in the hidden layer the representation of the position of the desired objects relative to the predetermined point in the scan window.

16. The method of claim 10, wherein the step of providing the hidden layer comprises:
providing a first hidden layer having local receptor fields, having shared weights; and
providing a second hidden layer having local receptor fields and no shared weights.

17. The method of claim 10 and further comprising normalizing objects that are disposed within the scan window to a normalized size.

18. A method for training a neural network, comprising the steps of:
providing a neural network having a input layer and an output layer with stored representations provided in a hidden layer that map the input layer to the output layer, the output layer having a plurality of output nodes;
defining a scan window that is sized to encompass more than one object;
mapping the scan window into the input of the neural network;
passing a desired object through the scan window; and
training the neural network to store a representation of multiple positions of the desired object within the scan window relative to a predetermined point within the scan window such that a given level of activation energy will be associated with at least one of the output nodes when a substantially identical object is disposed at a corresponding position within the scan window that corresponds with the stored representation of different ones of the trained positions of the desired object corresponding to different activation levels for the at least one of the output nodes.

19. The method of claim 18, wherein the step of training comprises training the neural network with backpropagation techniques.

20. The method of claim 18, wherein the step of passing a desired object through the scan window comprises passing a plurality of different desired objects through the the scan window, and the step of training the network comprises training the network to store a representation of the position of each of the different desired objects relative to the predetermined point in the scan window, with an output node associated with each one of the different desired objects, with each output node exhibiting a given level of activation energy for each position of the associated desired object in the scan window when a substantially similar object is disposed at a corresponding position in the scan window that corresponds to stored representation associated with the output node.

21. The method of claim 18, wherein the step of training comprises training the network with a plurality of generalized objects that are substantially similar to the desired object such that the representations stored in the hidden layer of the neural network for a given object is generalized.

* * * * *

UNITED STATES PATENT AND TRADEMARK OFFICE
CERTIFICATE OF CORRECTION

PATENT NO. : 5,440,651
DATED : August 8, 1995
INVENTOR(S) : Gale L. Martin

It is certified that error appears in the above-indentified patent and that said Letters Patent is hereby corrected as shown below:

On the Cover Page:

Item [56]
Under "Other Publications," replace "keeler" with --Keeler--.

Under "Other Publications," replace "Neumerals" with --Numerals--.

Column 4, line 40, insert --the window-- following "window),".

Signed and Sealed this

Twenty-third Day of July, 1996

Attest:

BRUCE LEHMAN

Attesting Officer          Commissioner of Patents and Trademarks